United States Patent [19]

Gotoh

[11] 4,449,090

[45] May 15, 1984

[54] CHARGING GENERATOR FOR VEHICLES

[75] Inventor: Hitoshi Gotoh, Hyogo, Japan

[73] Assignee: Mitsubishi Denki Kabushiki Kaisha, Tokyo, Japan

[21] Appl. No.: 418,960

[22] Filed: Sep. 16, 1982

[30] Foreign Application Priority Data

Sep. 19, 1981 [JP] Japan ................. 56-139707

[51] Int. Cl.³ ............ H04B 15/00; H01R 13/66; H02K 11/00
[52] U.S. Cl. ........................... 322/95; 310/72; 310/68 R; 339/147 R; 455/297
[58] Field of Search ........... 322/28, 58, 95, 96, 322/100; 455/297; 361/306–310; 307/10 R; 339/143 R, 147 R, 223 R, 278 R, 147; 310/68 R, 68 D, 72, 71

[56] References Cited

U.S. PATENT DOCUMENTS

| | | | |
|---|---|---|---|
| 2,843,770 | 7/1958 | Knapp et al. | 310/72 |
| 3,346,801 | 10/1967 | Reid et al. | 455/297 X |
| 3,538,362 | 11/1970 | Cheetham et al. | 310/68 D |
| 4,081,740 | 3/1978 | Teratani et al. | 322/28 |
| 4,268,770 | 5/1981 | Iwaki et al. | 310/72 |
| 4,329,665 | 5/1982 | Kawai et al. | 339/147 X |
| 4,384,331 | 5/1983 | Fukuhara et al. | 339/143 X |

FOREIGN PATENT DOCUMENTS 1396651  4/1975  United Kingdom ......... 455/297

Primary Examiner—R. J. Hickey
Attorney, Agent, or Firm—Sughrue, Mion, Zinn, Macpeak & Seas

[57] ABSTRACT

A vehicle generator is provided with a noise reduction apparatus in the form of an inductor coil wound about a plate connecting an output capacitor to an output terminal.

3 Claims, 6 Drawing Figures 4,449,090

CHARGING GENERATOR FOR VEHICLES

BACKGROUND OF THE INVENTION

The present invention relates to a means for preventing the noise generated inside of a vehicular charging generator from being transmitted to the outside.

In the prior art, the noise prevention means for a magneto of the above-identified type has been constituted by a single capacitor in an output circuit. More effective countermeasures are demanded in accordance with the increasing use of wireless devices and digital appliances.

FIG. 1 is a view of the internal construction of a rear bracket of one example of a vehicular charging generator according to the prior art. FIG. 1(A) is a top plan view; and FIG. 1(B) is a partially sectional view taken along line a-b-c-d of the top plan view of FIG. 1(A).

In these Figures, reference numerals 1, 2 and 3 indicate a rear bracket, a fastening seat of the former, and an output terminal seat of the rear bracket 1, respectively. Numeral 4 indicates a rectifier which is mounted in the rear bracket 1. A noise absorbing capacitor 5 is fastened together with the rectifier. A connecting plate 6 introduces the output of the rectifier to an output terminal 7. An output terminal bolt 8 is fixed in the output terminal seat 3 through insulating bases 9 and 10 by means of a hexagonal nut 11, and a brush holder 12 is fastened together with the output terminal bolt. A hexagonal nut 13 fastens the output terminal 7 on to the output terminal bolt 8 through a spring washer 14. Numeral 15 indicates a harness which is connected with the output terminal 7.

In the vehicular charging generator constructed as described above, the noise generated inside thereof is transmitted from the rectifier 4 through the connecting plate 6 and the output terminal 7 to the outside. However, this is absorbed by the capacitor 5 because the floating inductance belonging to the harness 15 connected with the outside, as illustrated in FIG. 2, functions as a choke element although it is at a low level. Here, FIG. 2 is a connection diagram showing the output portion of the vehicular generator. Reference numerals 2, 5 and 7 appearing in FIG. 2 indicate identical or corresponding portions as those in FIG. 1. In FIG. 2, numeral 18 indicates the floating inductance of the harness.

Since the floating inductance 18 has a low value, its noise absorbing effect is not necessarily sufficient and thus the effect is insufficient to meet the recent demand for noise reduction even if it is replaced by a capacitor having excellent characteristics.

SUMMARY OF THE INVENTION

It is an object of the present invention to reduce the noise by providing a more effective inductance in the output portion of the generator.

BRIEF DESCRIPTION OF THE DRAWINGS

FIG. 1 shows the internal construction of the rear bracket of an example of a vehicular generator according to the prior art: more particularly.

FIG. 3 shows the internal construction of an embodiment of the present device; wherein

DETAILED DESCRIPTION OF THE PREFERRED EMBODIMENTS

Figure 1A:
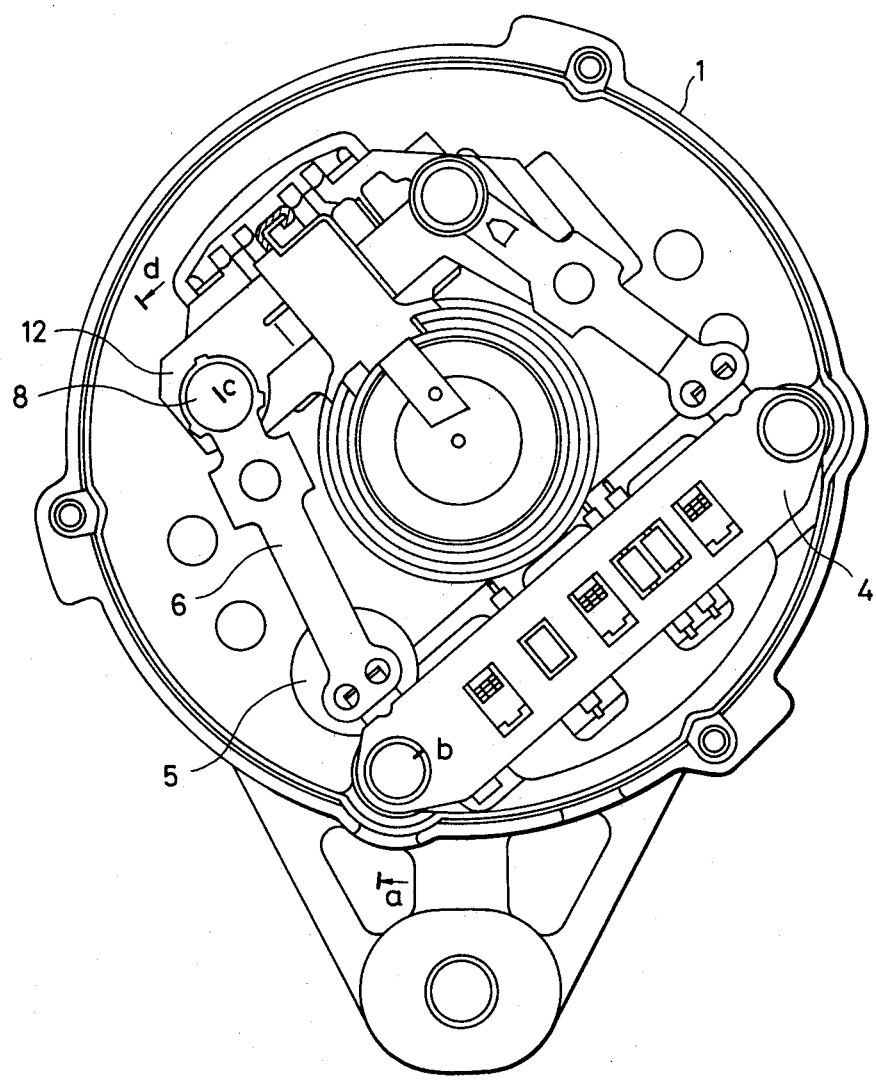
FIG. 1(A) is a top plan view.
Figure 1B:
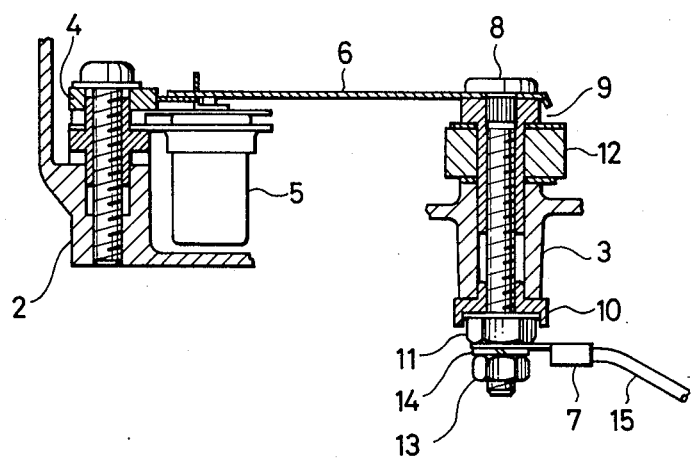
FIG. 1(B) is a partially sectional view taken along line a-b-c-d of FIG. 1(A)
Figure 3A:
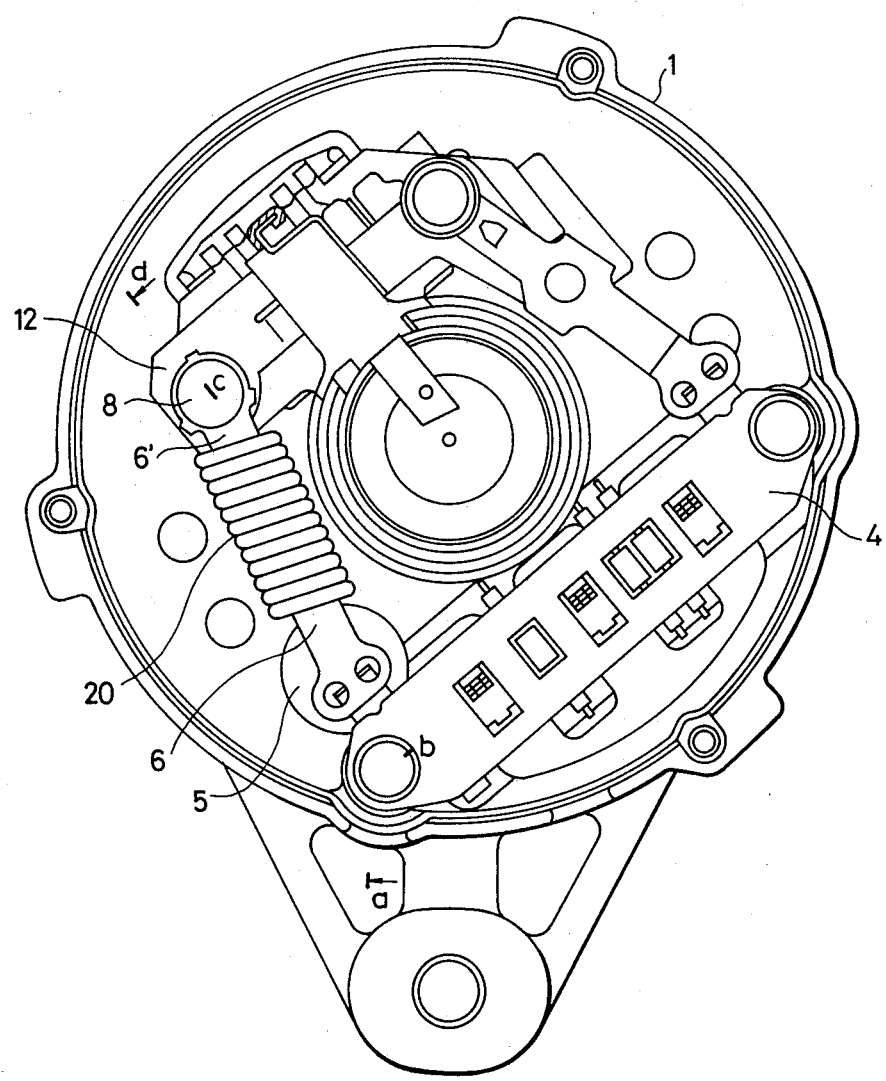
FIG. 3(A) is a top plan view.
Figure 3B:
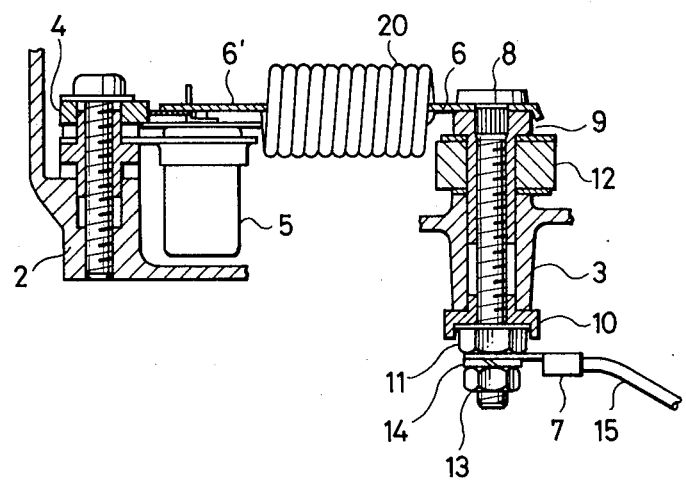
FIG. 3(B) is a partially sectional view taken along line a-b-c-d of FIG. 3(A)

Reference numerals 1 to 5 appearing in FIG. 3 indicate identical or corresponding portions to those indicated by the same numerals in FIG. 1. Numeral 20 indicates a solenoid coil which is fixedly wound on the connecting plate 6.

Figure 2:
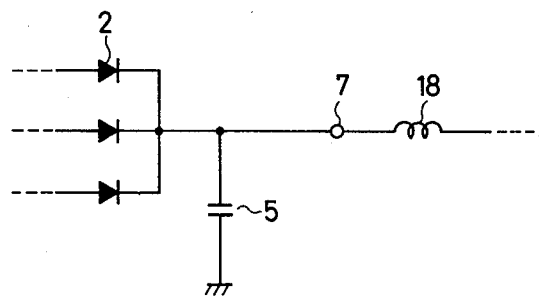
FIG. 2 is a connection diagram showing the output portion of the magneto of FIG. 1.
Figure 4:
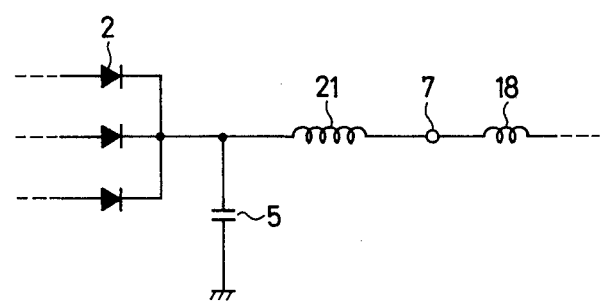
FIG. 4 is a connection diagram showing the output portion of the generator of FIG. 3.

The connection arrangement of the output portion of the vehicular charging generator having this construction is illustrated in FIG. 4. Numerals 2, 5, 7 and 18 indicate identical or corresponding portions as indicated by the identical numerals in FIG. 2. Numeral 21 indicates the inductance of the solenoid coil 20.

The noises generted inside of the vehicular generator having the construction as described are transmitted from the rectifier 4 to the connecting plate 6. However, those noises are effectively absorbed by the capacitor 5 because both the inductance due to the solenoid coil 20 and the floating inductance 18 of the harness 15 connected with the output terminal 7 function as effective choke elements.

As has been described hereinbefore, the present device enables the effective prevention of noise thanks to a simple construction in which a solenoid coil is mounted about the connecting plate of the prior art.

What is claimed is:
1. A vehicular charging generator, comprising:
   a rear bracket;
   a capacitor (5) mounted in said rear bracket;
   a connecting plate (6) connecting said capacitor and an output connection (8) mounted on said bracket; and
   an inductive solenoid coil (20) wound on said connecting plate for preventing noise from being transmitted to the outside.

2. A noise reduction apparatus for a generator, comprising:
   a rectifier (4) having an output within said generator;
   an output capacitor (5) coupled to said rectifier output;
   an output connection (8) within said generator;
   a connector (6) joining said output connection to said capacitor and said rectifier output; and
   an inductor comprising a solenoid coil (20) wound about said connector.

3. A vehicle generator of the type including a rectifier (4) mounted in the rear bracket (1) thereof, comprising:
   noise reduction means coupled to an output of said rectifier and comprising a noise absorbing capacitor (5) and an inductor (20);
   an output connection (8) mounted on said bracket; and
   a plate (6) connecting said output connection with an output of said rectifier, said inductor comprising a coil wound about said plate and constituting a choke element.

* * * * *